US008126600B2

(12) United States Patent
Conner et al.

(10) Patent No.: US 8,126,600 B2
(45) Date of Patent: Feb. 28, 2012

(54) METHOD AND APPARATUS FOR IMPROVING PILOT SITUATIONAL AWARENESS DURING FLARE TO TOUCHDOWN

(75) Inventors: Kevin J Conner, Kent, WA (US); Yasuo Ishihara, Kirkland, WA (US)

(73) Assignee: Honeywell International Inc., Morristown, NJ (US)

( * ) Notice: Subject to any disclaimer, the term of this patent is extended or adjusted under 35 U.S.C. 154(b) by 922 days.

(21) Appl. No.: 12/141,816

(22) Filed: Jun. 18, 2008

(65) Prior Publication Data

US 2009/0319105 A1 Dec. 24, 2009

(51) Int. Cl.
*G06F 19/00* (2006.01)

(52) U.S. Cl. ........................................... 701/16; 701/14

(58) Field of Classification Search .................. 701/3–6, 701/16–18, 9–14

See application file for complete search history.

(56) References Cited

U.S. PATENT DOCUMENTS 6,216,064 B1 * 4/2001 Johnson et al. ................... 701/4
6,317,663 B1 11/2001 Meunier et al.
6,711,479 B1 * 3/2004 Staggs ............................ 701/16
6,978,205 B2 12/2005 Ryan et al.
6,983,206 B2 1/2006 Conner et al.
7,079,951 B2 7/2006 Conner et al.
7,085,630 B2 8/2006 Ryan et al.
7,206,698 B2 4/2007 Conner et al.
2002/0089433 A1 7/2002 Bateman
2004/0044446 A1 3/2004 Staggs
2004/0075586 A1 4/2004 Glover

FOREIGN PATENT DOCUMENTS

GB 1327771 8/1973

* cited by examiner

*Primary Examiner* — Richard M. Camby

(74) *Attorney, Agent, or Firm* — Lowe Graham Jones PLLC

(57) ABSTRACT

A system and method for selectively alerting a pilot of an aircraft about distance remaining to the end of a runway. A position of the aircraft is received. A position of a runway is retrieved from a runway database. The retrieved position of the runway is compared to the received position of the aircraft to determine if the aircraft is within an alert envelope relative to the retrieved position of the runway. The position of the runway is subtracted from the position of the aircraft to determine a distance to the distal end of the runway. An alert to the pilot is generated based upon the distance to the distal end of the runway.

12 Claims, 4 Drawing Sheets

METHOD AND APPARATUS FOR IMPROVING PILOT SITUATIONAL AWARENESS DURING FLARE TO TOUCHDOWN

BACKGROUND OF THE INVENTION

A common error in landing an aircraft is that in the transition from the flare to the touch down, the aircraft is held at an excessive height over the threshold. The excessively high position of the aircraft could be the result of an unstable approach, or a stable but high approach. It may also occur during an instrument approach where the missed approach point is too close to or at the runway threshold. Regardless of the cause, excessive height over the threshold will most likely result in a touchdown beyond the normal aiming point. An extra 50 feet of height over the threshold will add approximately 1,000 feet to the landing distance.

In an optimal landing, the aircrafts arrive at the approached threshold window exactly on altitude (50 feet above the runway). For most airports, the aircraft will pass over the end of the runway with the landing gear 30-45 feet above the surface, depending on the landing flap setting and the location of the touchdown zone. It will take 5-7 seconds from the time the aircraft passes the end of the runway until touchdown. The flare is initiated by increasing the pitch attitude just enough to reduce the sink rate to 100-200 feet per minute when the landing gear is approximately 15 feet above the runway surface.

The normal speed bleed off during the time between the passing the end of the runway and touchdown is 5 knots. Most of the decrease occurs during the flare when thrust is reduced. When the aircraft has excess energy (speed), the flare is extended (held off) so that any additional speed is bled off.

A proper approach positions the aircraft to touchdown in the touchdown target zone, which is usually about 1,000 feet beyond the runway threshold. Once the main wheels have contacted the runway, the pilot must maintain directional control and initiate the stopping process. The stop must be made on the runway that remains in front of the aircraft. The runway distance available to stop is longest if the touchdown was on target. The energy to be dissipated is least if there is no excess speed.

At the point of touchdown, the aircraft represents a very large mass that is moving at a relatively high speed. The large total energy must be dissipated by the three forces available for stopping the aircraft: wheel braking, reverse thrust, and aerodynamic braking. Of the three, the brakes are the most effective, and therefore the most important stopping force for most landings. It is advantageous for a pilot to make a touchdown "on the numbers" as to do so will leave the optimum length of runway for stopping the aircraft. Where the pilot has failed to make the touchdown "on the numbers," the pilot must evaluate whether there remains a sufficient length of runway to stop the aircraft. Failure to judge correctly the remaining length of runway may result in runway excursion. There is an unmet need in the art for a means and a device to enhance the situational awareness of a pilot landing an aircraft particularly as to the length of runway remaining.

SUMMARY OF THE INVENTION

The invention provides cues as to the aircraft's position relative to the distal end of the runway during maneuvers including those from flare to touchdown. A system and method for selectively alerting a pilot of an aircraft is based upon a distance remaining to a distal end of a proximate runway. A position of the aircraft is received. A position of a runway is retrieved from a runway database. The retrieved position of the runway is compared to the received position of the aircraft to determine if the aircraft is within an alert envelope relative to the retrieved position of the runway. The position of the runway is subtracted from the position of the aircraft to determine a distance to the distal end of the runway. An alert to the pilot is generated based upon the distance to the distal end of the runway.

According to a first aspect of the present method for determining distance to the end of the runway during flare to touchdown, a determination is made as to whether the aircraft is within altitude limits, beyond a threshold distance down the runway, and not performing a missed approach.

A non-limiting embodiment of the system utilizes a method of comparing aircraft position to locations stored in a runway database to determine the distance between the aircraft and the end of the runway. This information may be provided to the pilot aurally and/or visually. Additionally, the information will be suppressed if the aircraft lands or does a go-around. The speed of the aircraft can be utilized to augment the timing of the information such that the aural will complete at a nominal point (i.e. the voice message will be lead by a term of the speed and the duration of the message). This will allow an example message of "3000 Remaining" to complete just as the aircraft reaches the 3000 feet remaining point on the runway. Determination of landing can be made using the radio altimeter and suppressing callouts once the value is below a reasonable height (5 feet). The go-around suppression can utilize an upper radio altitude limit of 100 feet and additionally be augmented by using altitude rate, so that the callouts are suppressed.

Further aspects of the present method for providing cues to the pilot during flare to touchdown are described hereinafter in the detailed description of the present invention.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
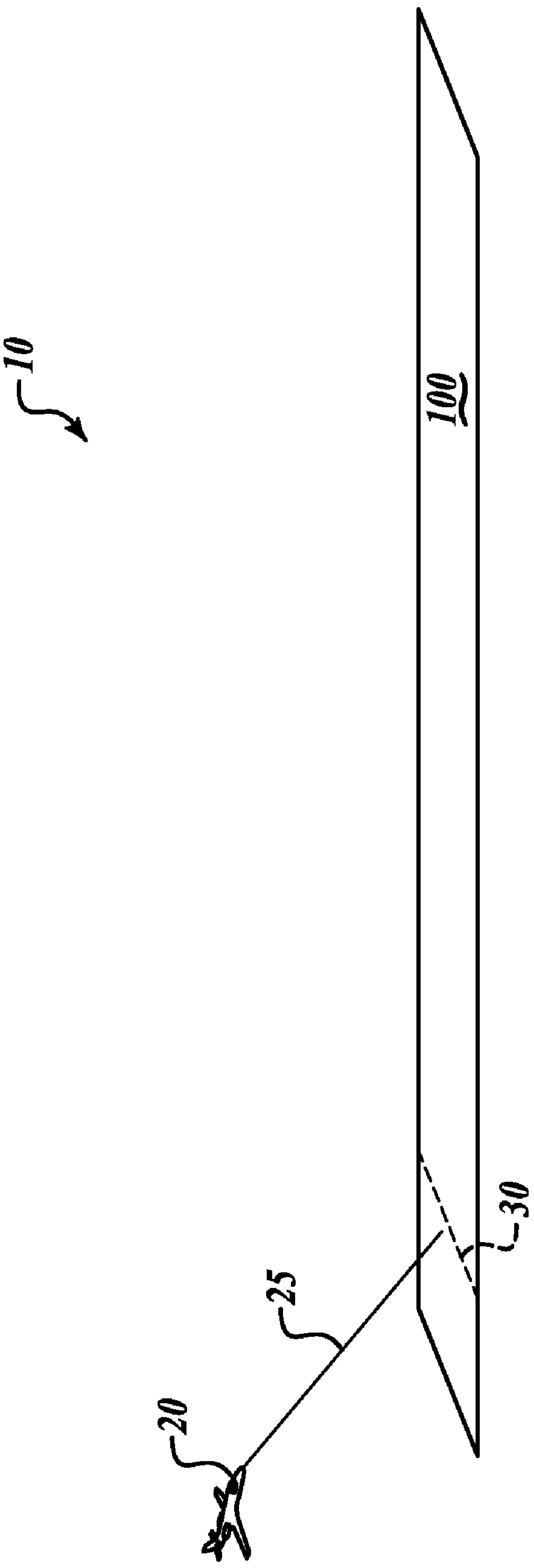
FIG. 1 is a perspective view of a runway landing environment showing exemplary touchdown and callout features of the present system.

FIG. 1 is a perspective view of a runway landing environment 10 showing an aircraft 20 approaching a runway 100 according to an anticipated glidepath 25 defining the likely path of the aircraft to the runway 100. A desired touchdown point 30 is located 1000 (300 meters) or so feet from the threshold end of the runway 100.

Figure 2:
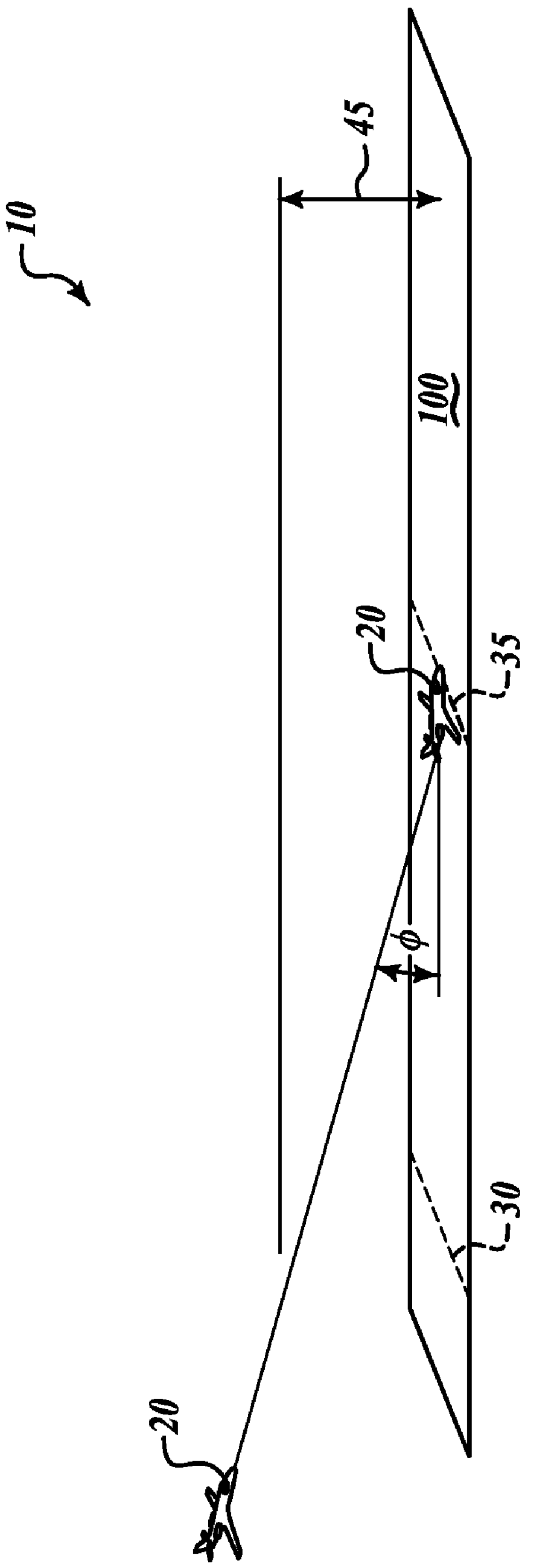
FIG. 2 is a perspective view of the runway landing environment showing the exemplary touchdown and a suppression limit.

FIG. 2 is a perspective view of the runway landing environment 10 and an altitude limit 45 that is a height above runway value. As the aircraft 20 nears the runway 100 at a glide slope angle φ, warnings are enabled when the height of the aircraft 20 is less than the altitude limit 45 (e.g., 100 feet) and is beyond the desired touchdown point 30. An alert (aural and/or visual) is generated to indicate the amount of runway remaining. In various embodiments, the intervals for the alert may vary. In one non-limiting embodiment, the alerts may become more frequent as the aircraft approaches the distal end of the runway. The alerts cease when the aircraft 20 lands or executes a missed approach. Various techniques may be used to determine when the aircraft 20 is on the ground or executing a missed approach. For example, vertical speed may be used to indicate a missed approach or an intent to land.

In additional embodiments, a position of the gear is used to determine the intent of the pilot relative to landing. Thus, if the pilot flies the aircraft into the envelope while the gear is up, the processor will suppress the warnings as the pilot's intent is not to land. If, on the other hand the gear is down, the processor will not suppress the alerts.

Figure 3:
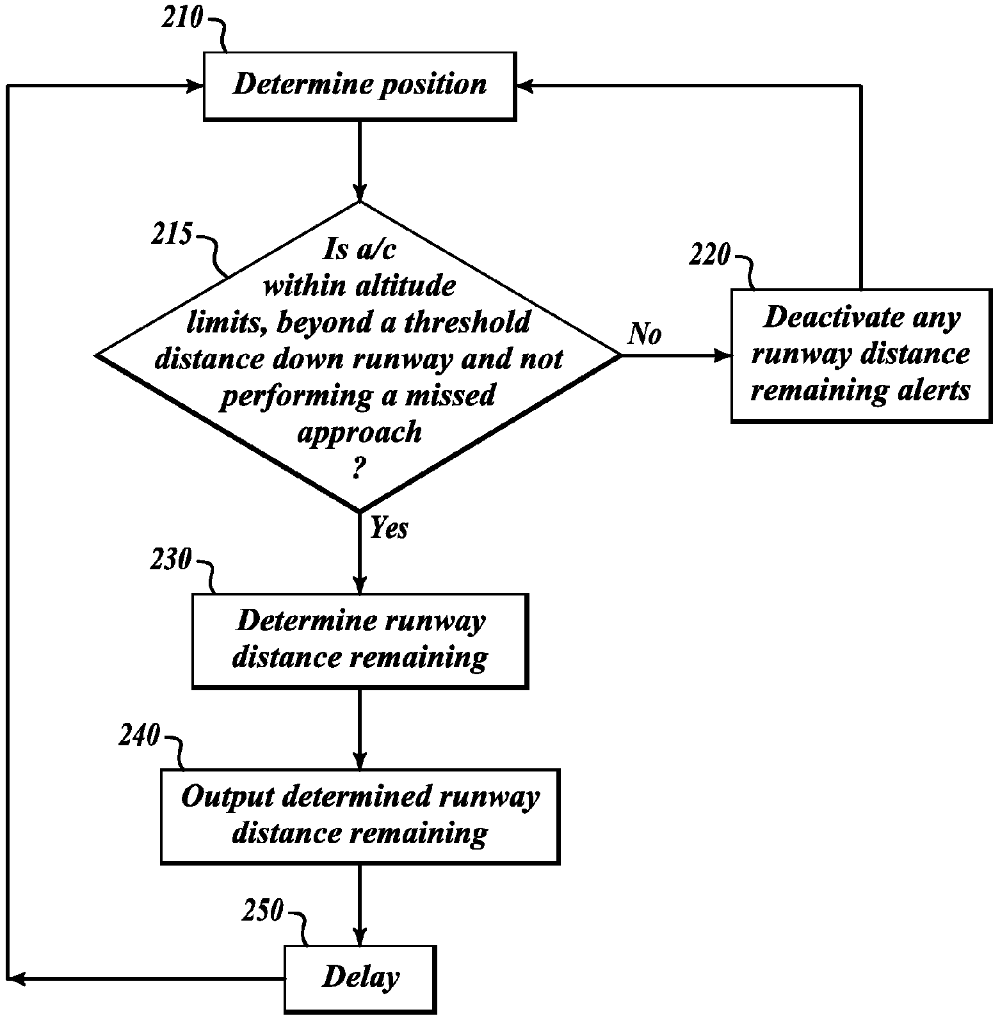
FIG. 3 is a method flowchart showing the method for providing pilot situation awareness during flare to touchdown of an aircraft according to an embodiment of the invention.

FIG. 3 is a flowchart for an embodiment of a method for generating messages providing pilot situational awareness during flare to touchdown. In determining an aircraft position at a block 210, any of the on board navigational systems might be suitably used to establish a position. GPS or inertial navigation or a hybrid of the two might be advantageously used to establish or to refine a three dimension fix for position. Additionally, a radio altimeter, a barometric altimeter, and any radio navigational devices such as LORAN might also be optionally used.

Once, a position is established, at a block 215, the processor compares the position to a selected runway stored in a runway database to determine (1) whether the aircraft is airborne and below the designated altitude limit, (2) beyond a designated threshold distance down the runway, and (3) not performing a missed approach. While these appear to be distinct questions, in preferred embodiments, the questions define a region relative to each runway in which the three conditions are met. Resolution of the three conditions in such embodiments is to compare the known position of the aircraft to "on" regions for the selected runway.

If the position determined in the block 210 meets the three conditions set forth in the block 215, it will be within a designatable three-dimensioned space. Because in a preferred embodiment, the runway database is installed aboard an aircraft, the determination that an aircraft position relative to the runway is within the altitude limits beyond the "threshold distance down the runway and not performing a missed approach" is merely a determination that the aircraft is within boundaries stored within the runway database given the flight characteristics of the aircraft in which the database is installed. In alternate embodiments distinct boundaries of the envelope can be recalled based upon flight characteristics of aircraft airspeed of the aircraft, position of aircraft flaps, the position of the gear, or based upon combinations of the several factors.

If the aircraft is not within the space designated by the conditions, the condition is not true such that at a block 220, the method deactivates any alerts indicating a runway distance remaining. In such an instance, the alerts are not useful and would tend to distract the pilot.

If at the decision block 215, the condition is true, then at a block 230 the method determines runway distance remaining by comparison of the aircraft position with retrieved data from the runway database.

An output is provided at a block 240. In an embodiment, an enunciator gives an aural warning in words to the effect, "two thousand feet remaining" where the aircraft is two thousand feet from the distal end of the runway. Alternate embodiments flash a similar message on a display or ring a chime or other alarm to signal a position relative the remaining runway. Combinations of the alarms are also useful.

To assure that the enunciator does not, itself distract the pilot, a designatable delay can be selected prior to initiating the method again at a block 250. The delay can be temporal or special (i.e., 3 seconds or 1000 ft).

Figure 4:
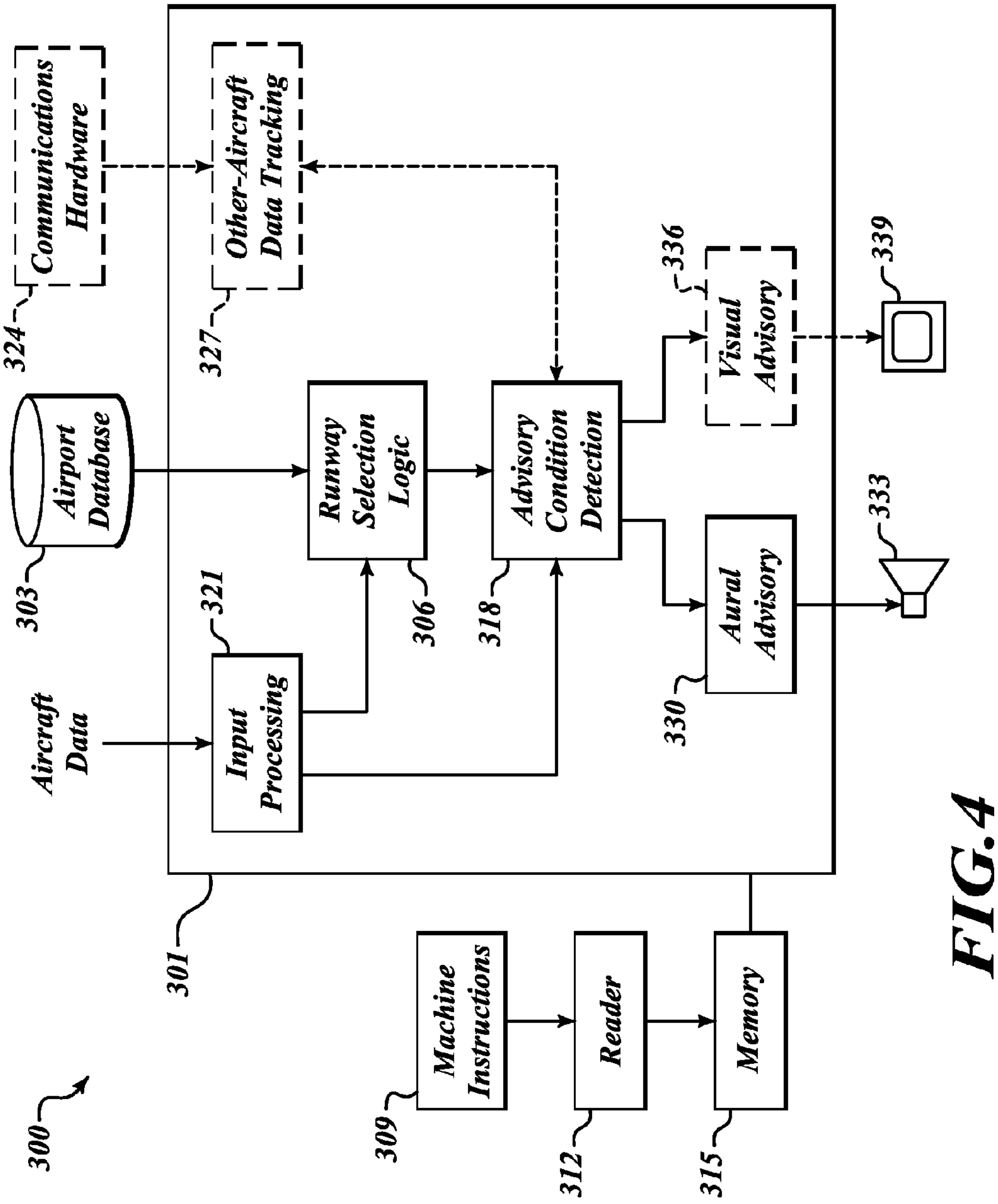
FIG. 4 is an exemplary apparatus for providing pilot situation awareness during flare to touchdown of an aircraft according to an embodiment of the invention.

FIG. 4 illustrates a non-limiting example of a system 300 according to the invention. In a preferred embodiment of the system 300, a runway database 303 provides the system with indications as to the location of the runways.

An aircraft position is input to a processor 301 at an input processing buffer 321. At a runway selection logic block 306, the aircraft position at the input processing buffer 321 is compared to retrieved runway positions as stored in the runway database 303 to determine whether a landing on any of the retrieved runways is likely based upon the position of the aircraft and the flight characteristics of the aircraft. Once a relevant runway is determined, the advisory condition detection block 318 determines whether the aircraft is in a position for which an advisory is designated.

As illustrated in the non-limiting embodiment, the advisory condition detection block 318 receives the aircraft data from the input processing buffer 321, though such is not the only means for drawing a position of the aircraft. Communications hardware 324 could be used to for receiving data from among other sources an airport tower with information as to the position based upon air traffic control radar. In an "Other Aircraft Data Tracking" buffer 327, the data is presented to the advisory condition detection block 318 for comparison with the advisory envelope.

In one embodiment, stored within the database along with the physical location of the runways is an advisory envelope as discussed in relation to the block 215 (FIG. 3). As there described, presence of the aircraft within the defined envelope, the envelope being based upon flight characteristics of the aircraft, will trigger the further activity of the system 300. In an alternative embodiment, stored machine instructions 309 are read by a reader 312 and placed into a random access memory 315 to instruct the processor 301 to determine whether advisory action is necessary based upon an aircraft position and data drawn from the runway database 303.

In the event that the aircraft position is detected as requiring an advisory, at the advisory condition detection block 318, the advisory condition detection block 318 triggers an aural advisory block 330 that generates a suitable warning as earlier described through an audio system 333. Where a visual advisory is designated, it is generated at a block 336 for display on a display 339 according to the calculated distance remaining on the runway.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for alerting a pilot of an aircraft about runway distance remaining, the method comprising:

receiving a position of the aircraft;

comparing altitude of the aircraft to a predefined altitude limit;

comparing a previously stored runway information to the received position of the aircraft;

determine if the aircraft is within an alert envelope based on the comparisons;

determining a runway distance remaining, if the aircraft is determined to be within the alert envelope; and generating an alert to the pilot based upon the runway distance remaining, wherein the alert identifies runway distance remaining.

2. The method of claim 1, wherein the predefined altitude limit is a height above runway value.

3. The method of claim 1, wherein generating the alert includes generating an aural warning.

4. The method of claim 3, wherein the aural warning includes words describing the runway distance remaining.

5. The method of claim 1, wherein generating the alert includes generating a visual warning on a display.

6. The method of claim 5, wherein the visual warning includes of one of words, figures, and graphic indicators describing the runway distance remaining.

7. A system for generating an alert to the pilot of an aircraft about runway distance remaining, the system comprising:

a database comprising runway information;

a position sensor configured to produce aircraft position and altitude information;

a processor in data communication with the database and the position sensor, the processor comprising:

an input processing buffer configured to receive the aircraft position and altitude information and runway information;

an advisory condition detection component configured to determine whether the aircraft is within an advisory envelope based upon received the aircraft position and altitude information, runway information, and a predefined altitude limit; and a component configured to determine runway distance remaining, if the aircraft is determined to be within the alert envelope and to generate an alert to the pilot based upon the distance to the distal end of the runway;

an output device configured to output the generated alert, wherein the alert identifies runway distance remaining.

8. The system of claim 7, wherein the predefined altitude limit is a height above runway value.

9. The system of claim 7, wherein the output device is an aural output device.

10. The system of claim 9, wherein the alert includes words describing the runway distance remaining.

11. The system of claim 7, wherein the output device is a display.

12. The system of claim 11, wherein the alert includes of one of words, figures, and graphic indicators describing the runway distance remaining.

* * * * *